(12) United States Patent
Kim

(10) Patent No.: US 12,515,622 B2
(45) Date of Patent: Jan. 6, 2026

(54) METHOD OF CONTROLLING BRAKING OF A VEHICLE

(71) Applicants: HYUNDAI MOTOR COMPANY, Seoul (KR); KIA CORPORATION, Seoul (KR)

(72) Inventor: Jinyong Kim, Daegu (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 218 days.

(21) Appl. No.: 17/991,504

(22) Filed: Nov. 21, 2022

(65) Prior Publication Data

US 2023/0211759 A1 Jul. 6, 2023

(30) Foreign Application Priority Data

Dec. 30, 2021 (KR) .................. 10-2021-0192630

(51) Int. Cl.
*B60T 8/17* (2006.01)
*B60T 17/22* (2006.01)
*F16D 66/00* (2006.01)

(52) U.S. Cl.
CPC ............ *B60T 8/1708* (2013.01); *B60T 17/22* (2013.01); *B60T 2201/02* (2013.01); *B60T 2201/04* (2013.01); *B60T 2210/20* (2013.01); *B60T 2250/02* (2013.01); *B60T 2250/04* (2013.01); *B60T 2260/09* (2013.01); *F16D 2066/001* (2013.01)

(58) Field of Classification Search
CPC .... B60T 8/1708; B60T 17/22; B60T 2201/02; B60T 2201/04; B60T 2210/20; B60T 2250/02; B60T 2250/04; B60T 2260/09; B60T 7/12; B60T 8/1766; F16D 2066/001
See application file for complete search history.

(56) References Cited

U.S. PATENT DOCUMENTS

| | | | | |
|---|---|---|---|---|
| 2003/0090145 | A1* | 5/2003 | Andersson | B60T 13/585 303/9 |
| 2010/0304929 | A1* | 12/2010 | Hilberer | B60T 8/248 192/220 |
| 2021/0163000 | A1* | 6/2021 | Dieckmann | G01S 13/931 |
| 2022/0089138 | A1* | 3/2022 | Chu | B60T 13/683 |

FOREIGN PATENT DOCUMENTS

DE     10012448 A1 * 10/2001 ............. B60T 17/22

OTHER PUBLICATIONS

English translation of Eckert et al. (DE 10012448) (Year: 2001).*

* cited by examiner

*Primary Examiner* — Kyle J Kingsland
(74) *Attorney, Agent, or Firm* — Lempia Summerfield Katz LLC

(57) ABSTRACT

A method of controlling braking of a vehicle is provided to minimize heat generation in a brake system at a time of braking the vehicle while securing an appropriate braking force. The method includes determining whether an inclination condition for a road satisfies a preset condition, and when the inclination condition for the road satisfies the preset condition, performing cyclic brake control of alternately braking wheels of two or more different axles of the vehicle.

18 Claims, 10 Drawing Sheets

FIG. 3
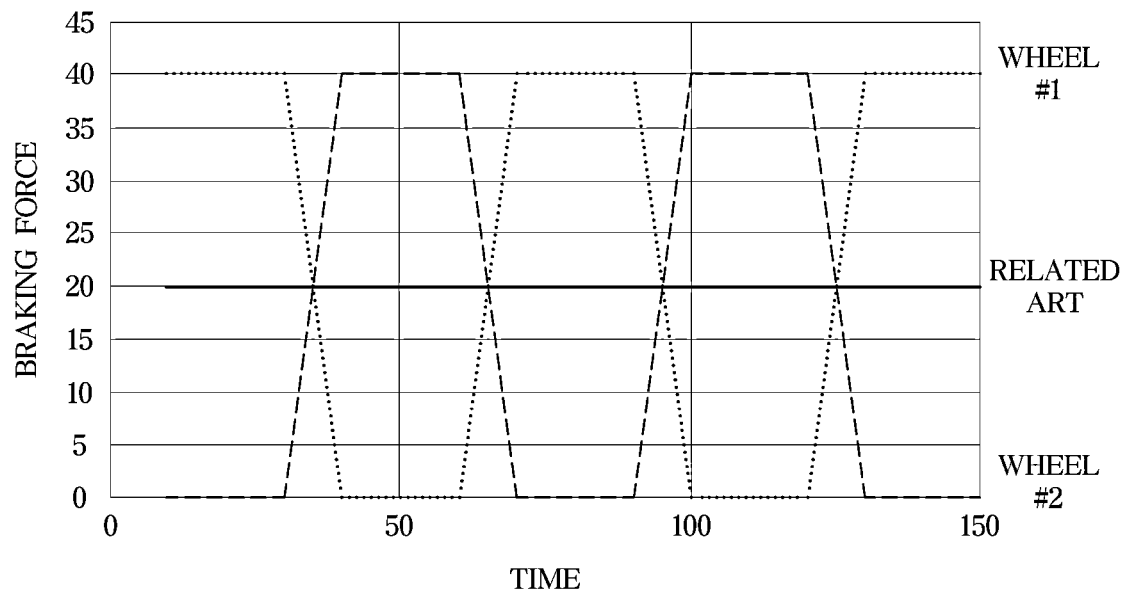
310: BRAKING FORCE
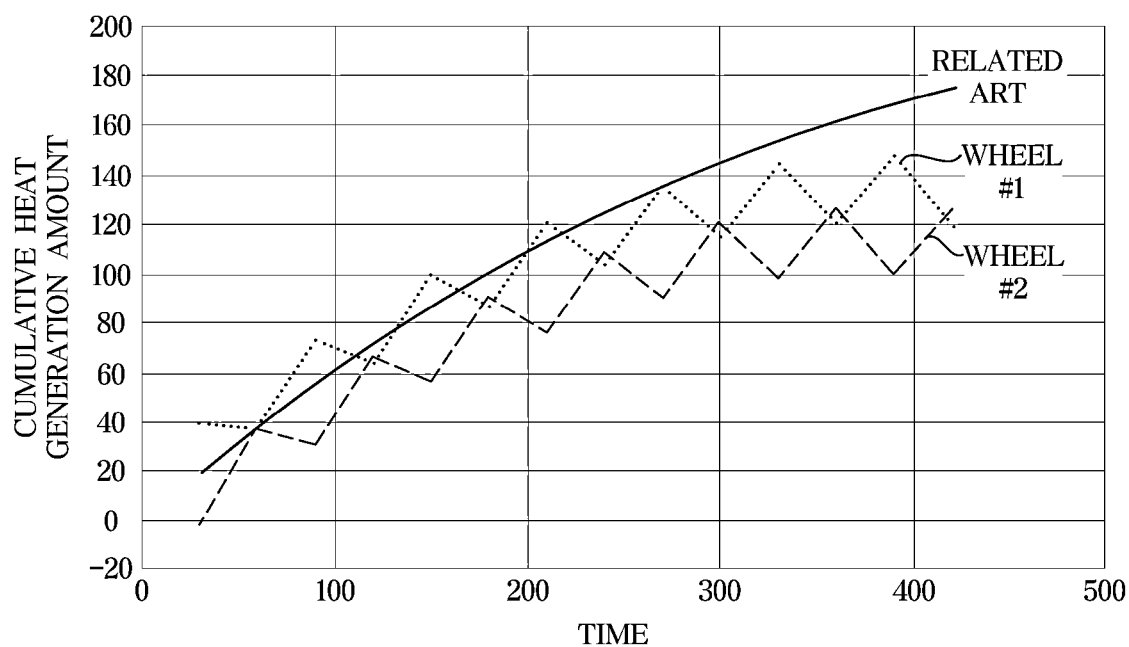
350: HEAT GENERATION

FIG. 4
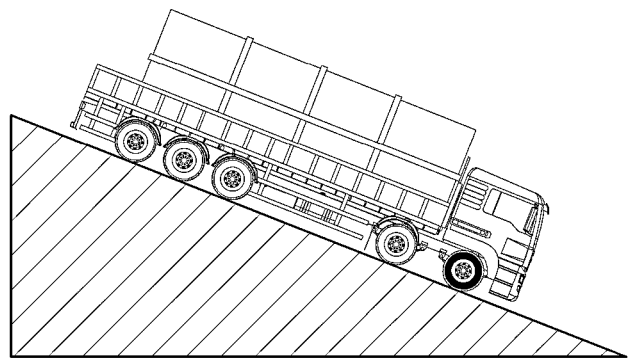
410: #1
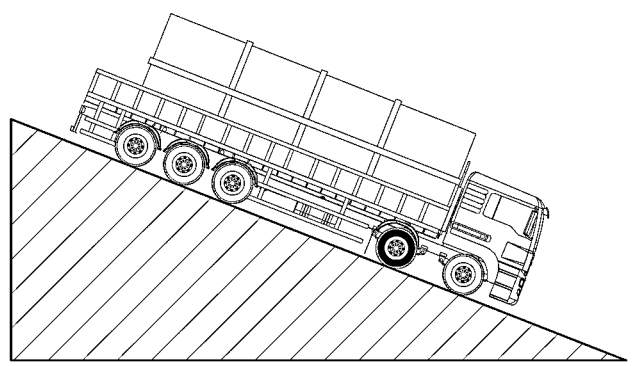
420: #2
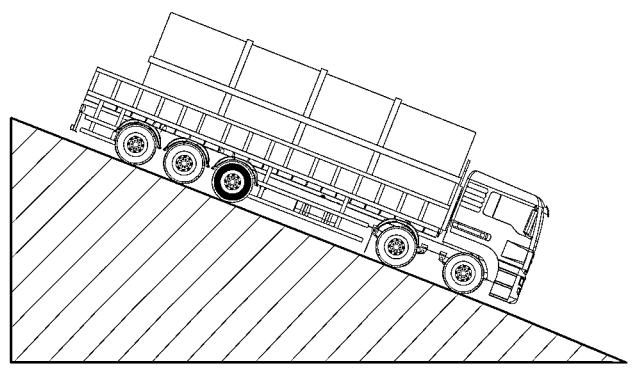
430: #3

FIG. 5
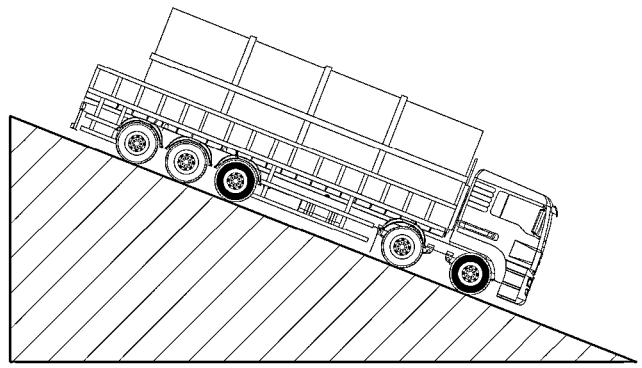
510: #1 & #3
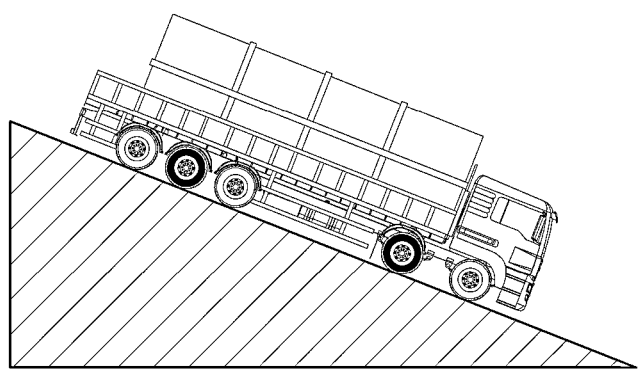
520: #2 & #4
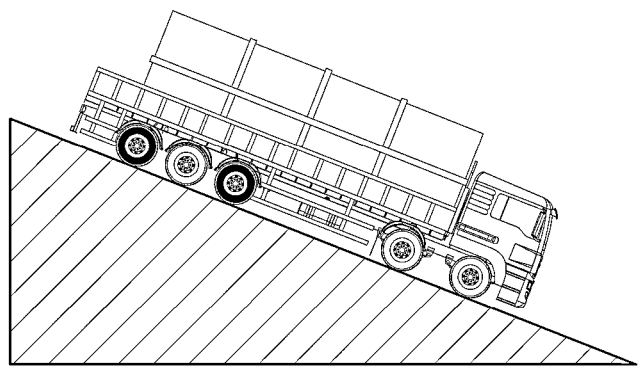
530: #3 & #5

FIG. 6
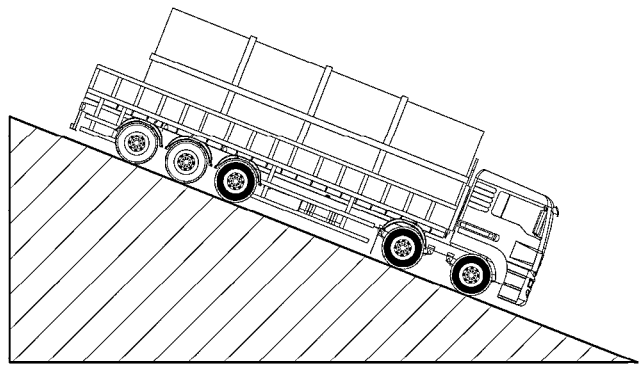
610: #1 & #2 & #3
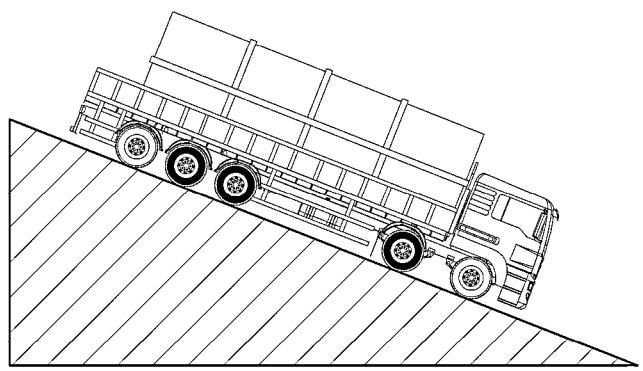
620: #2 & #3 & #4
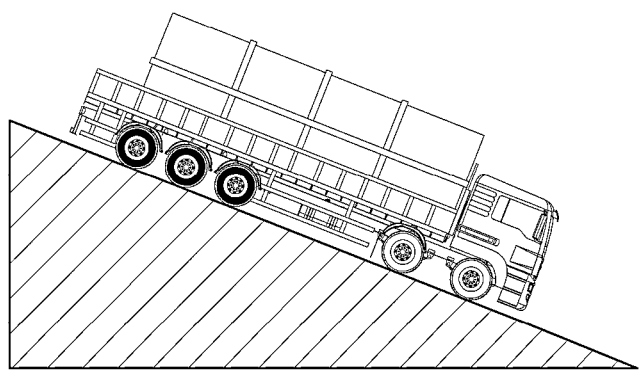
630: #3 & #4 & #5

METHOD OF CONTROLLING BRAKING OF A VEHICLE

CROSS-REFERENCE TO RELATED APPLICATION

This application is based on and claims the benefit of and priority under 35 U.S.C. § 119 to Korean Patent Application No. 10-2021-0192630, filed on Dec. 30, 2021 in the Korean Intellectual Property Office, the entire disclosure of which is incorporated herein by reference.

BACKGROUND

1. Technical Field

The present disclosure relates to a vehicle, and more specifically, to brake control of a vehicle.

2. Description of the Related Art

A braking force of a vehicle is generated when a brake oil hydraulic pressure is transmitted to a caliper in response to a driver's manipulation of a brake pedal, and the caliper allows a brake pad to be pressed against a brake disc (or a drum) by the delivered hydraulic pressure. The rotating brake disc (or drum) comes into frictional contact with the surface of the brake pad, and the frictional force causes the vehicle to decelerate. In some types of vehicles, pneumatic pressure may be used instead of hydraulic pressure, or hydraulic pressure and pneumatic pressure may be used together.

In a travelling condition, such as a downhill on a long slope, when braking is continuously performed for a long period of time, the amount of heat generated by friction between the brake pad and the brake disc (or drum) may become excessive, which results in insufficient braking force or failure to brake.

SUMMARY

Therefore, it is an object of the disclosure to provide a vehicle capable of minimizing heat generation in a brake system at a time of braking the vehicle and securing an appropriate braking force.

The technical objectives of the disclosure are not limited to the above, and other objectives may become apparent to those of ordinary skill in the art based on the following descriptions.

According to an aspect of the disclosure, there is provided a method of controlling braking of a vehicle, the method including: determining whether braking of a vehicle is required; and performing cyclic brake control of alternately braking wheels of two or more different axles of the vehicle when the braking of the vehicle is required.

The cyclic brake control may be performed when an inclination condition for a road satisfies a preset condition in a situation in which the braking is required. The preset condition may include a slope length of a road in front of the vehicle and an average gradient of the road in front of the vehicle.

Whether to perform the cyclic brake control may be determined further based on a gross vehicle weight of the vehicle in addition to the inclination condition for the road.

The preset condition may further include a condition that a cumulative heat generation amount of a wheel generating a braking force in the cyclic brake control does not exceed a preset level.

According to another aspect of the disclosure, there is provided a method of controlling braking of a vehicle, the method including: determining whether braking of a vehicle is required; and when the braking of the vehicle is required, first performing auxiliary braking on the vehicle and then selectively performing cyclic brake control. The cyclic brake control includes alternately braking wheels of two or more different axles of the vehicle.

A preset condition for the auxiliary braking may include a gross vehicle weight, a slope length of a road in front of the vehicle, an average gradient of the road in front of the vehicle, and a road length that is in proportion to a vehicle speed.

The cyclic brake control may be performed when an inclination condition for a road satisfies a preset condition in a situation in which the braking is required. The preset condition may include a slope length of a road in front of the vehicle and a minimum gradient of the road in front of the vehicle.

Whether to perform the cyclic brake control may be determined further based on a gross vehicle weight of the vehicle in addition to the inclination condition for the road.

The auxiliary braking may include exhaust braking.

The minimum gradient of the road in front of the vehicle may be a gradient at which deceleration of the vehicle by exhaust braking does not occur.

The slope length may be a length at which shift cycling does not occur when the vehicle is driven.

According to another aspect of the disclosure, there is provided a method of controlling braking of a vehicle, the method including determining whether braking of a vehicle is required, and depending on whether a preset entry condition is satisfied in a situation in which the braking of the vehicle is required, performing one selected from among: performing only cyclic brake control of alternately braking wheels of two or more different axles of the vehicle; performing endurance brake interlock brake control of first performing auxiliary braking on the vehicle and then selectively performing the cyclic brake control; and performing only auxiliary braking of generating an auxiliary braking force.

When the preset entry condition for the cyclic brake control is satisfied while the preset entry condition for the endurance brake interlock brake control is not satisfied, only the cyclic brake control may be performed.

When the preset entry condition for the cyclic brake control and the preset entry condition for the endurance brake interlock brake control is satisfied, the endurance brake interlock brake control may be performed.

When the preset entry condition for the cyclic brake control is not satisfied while the preset entry condition for the endurance brake interlock brake control is not satisfied, only the auxiliary brake control may be performed.

The method may further include driving the vehicle in a cruise control mode before the determining of whether the braking is required.

According to another aspect of the disclosure, there is provided a method of controlling braking of a vehicle, the method including: activating a cyclic brake control mode of alternately braking wheels of two or more different axles of a vehicle; determining whether braking of a vehicle is required when the cyclic brake control mode is activated; and when a preset entry condition for endurance brake interlock brake control is satisfied in a situation in which the braking of the vehicle is required, performing endurance brake interlock brake control of first performing auxiliary braking and then selectively performing the cyclic brake control.

The method may further include driving the vehicle in a cruise control mode before the determining of whether the braking is required.

BRIEF DESCRIPTION OF THE DRAWINGS

These and/or other aspects of the disclosure should become apparent and more readily appreciated from the following description of the embodiments, taken in conjunction with the accompanying drawings of which:

FIG. 3 is a diagram illustrating characteristics of cyclic brake control of a vehicle according to an embodiment of the disclosure;

FIG. 4 is a diagram illustrating an example of cyclic brake control of a vehicle according to an embodiment of the disclosure;

FIG. 5 is a diagram illustrating another example of cyclic brake control of a vehicle according to another embodiment of the disclosure;

FIG. 6 is a diagram illustrating another example of cyclic brake control of a vehicle according to another embodiment of the disclosure;

DETAILED DESCRIPTION

Figure 1:
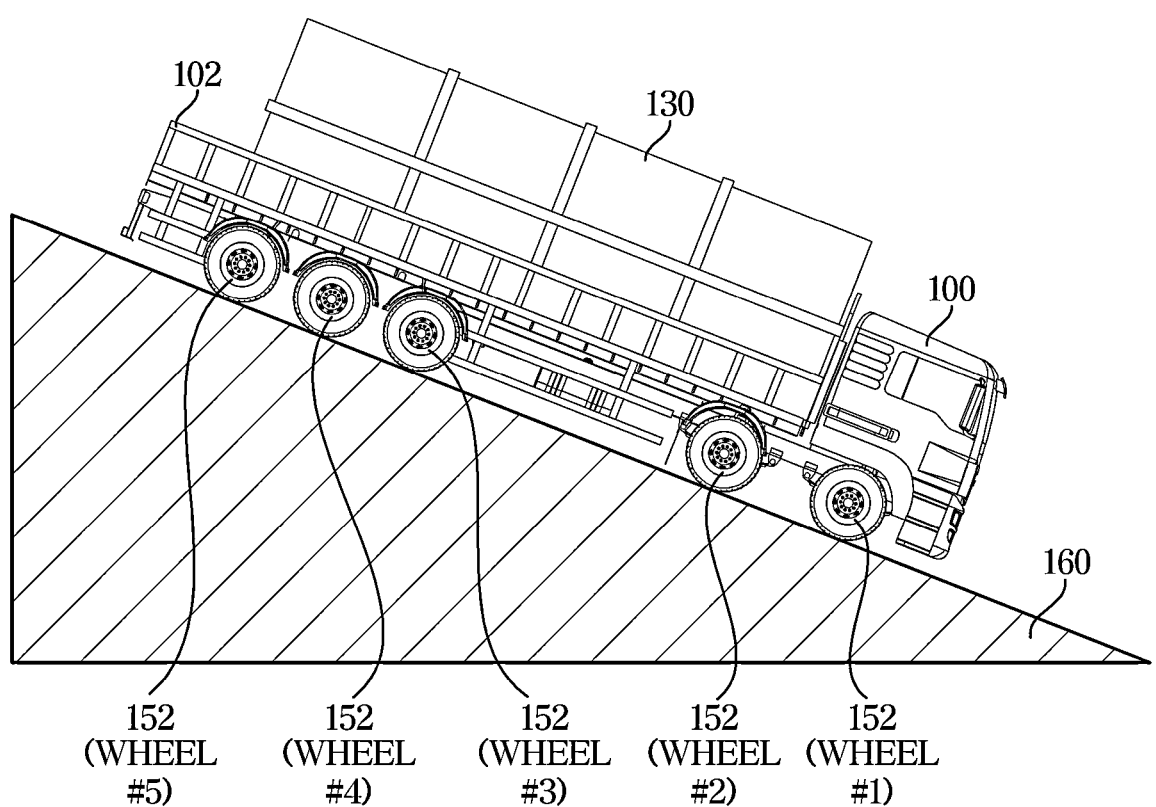
FIG. 1 is a view illustrating a vehicle according to an embodiment of the disclosure.

FIG. 1 is a view illustrating a vehicle according to an embodiment of the disclosure.

Referring to FIG. 1, a vehicle 100 according to an embodiment of the disclosure is a cargo transport vehicle suitable for transporting cargo. The vehicle 100 has an elongated load box 102 for loading a large amount of cargo 130. In addition, in order to move the vehicle 100 having the elongated loading box 102, a plurality of wheels 152 may be provided on a plurality of axles.

In FIG. 1, the plurality of wheels 152 are divided into wheel #1, wheel #2, wheel #3, wheel #4, and wheel #5. The vehicle 100 of FIG. 1 is provided with five axles. The foremost axle of the vehicle 100 is determined as the first axle, and the rearmost axle of the vehicle 100 is determined as the fifth axle. The wheel #1, the wheel #2, the wheel #3, the wheel #4, and the wheel #5 are connected to the first axle, the second axle, the third axle, the fourth axle, and the fifth axle, respectively.

In FIG. 1, the vehicle 100 is illustrated as descending a slope 160 in a smart cruise control (SCC) mode. The vehicle 100 according to the disclosure may, alone or in combination, perform cyclic brake control and endurance brake interlock brake control, in order to solve a limitation or problem of heat generation in a braking process when a medium/large vehicle for cargo transportation descends a slope in SCC mode. Details of the cyclic brake control and endurance brake interlock brake control according to the disclosure are described in detail below.

Figure 2:
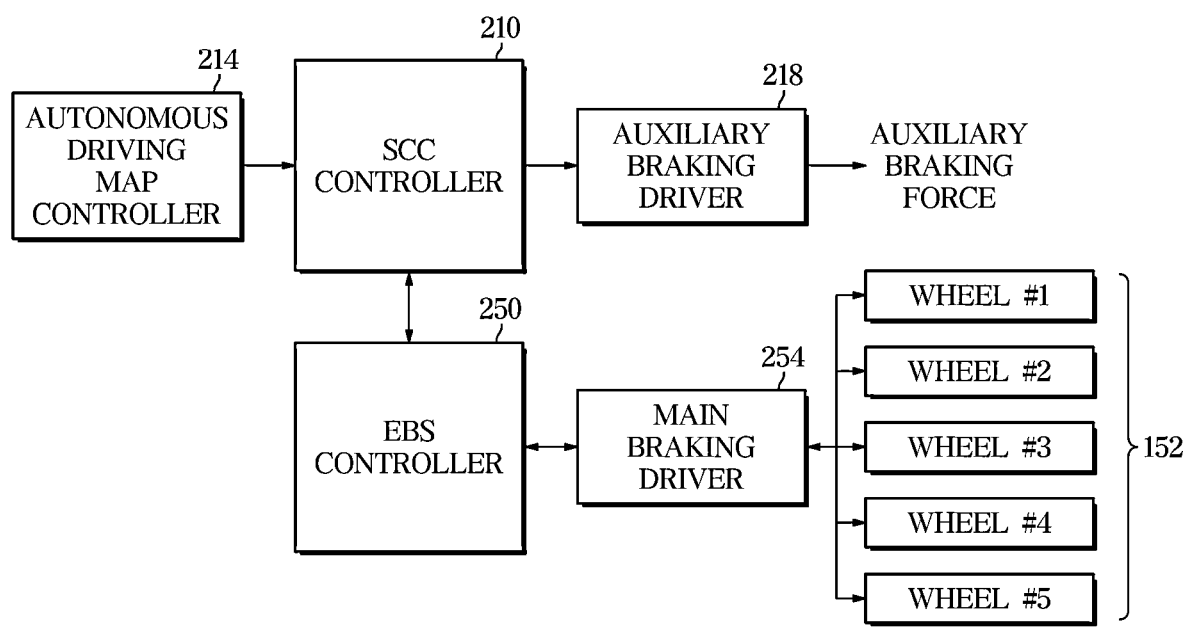
FIG. 2 is a diagram illustrating a control system of a vehicle according to an embodiment of the disclosure.

FIG. 2 is a diagram illustrating a control system of a vehicle according to an embodiment of the disclosure.

Referring to FIG. 2, a smart cruise control (SCC) controller 210 and an electronic brake system (EBS) controller 250 are connected to each other so as to communicate with each other. The SCC controller 210 is communicatively connected to an autonomous driving map controller 214 and an auxiliary braking driver 218. The EBS controller 250 is communicatively connected to a main braking driver 254 and a plurality of wheels 152.

The SCC controller 210 is provided to perform overall smart cruise control on the vehicle 100. The SCC controller 210 determines the amount of braking of the main braking and transmits the determined amount of braking to the main braking driver 254. The SCC controller 210 generates an auxiliary braking on/off signal and transmits the generated auxiliary braking on/off signal to the auxiliary braking driver 218. In addition, the SCC controller 210 receives information about the weight of the vehicle 100, the downhill gradient (%) of the road, and the length of the slope, and determines whether to enter the cyclic brake control and the endurance brake interlock brake control according to an embodiment of the disclosure.

The autonomous driving map controller 214 provides the SCC controller 210 with information about an autonomous driving map. The autonomous driving map is an exclusive map for autonomous driving of the vehicle 100 (including semi-autonomous driving or driver assistance control) and provides more precise map information than a general navigation map. In addition, the autonomous driving map includes information about the curvature and gradient of the road, the length of the slope section, the speed limit, the junction, and the like. The autonomous driving map controller 214 may provide the SCC controller 210 with information about the gradient and the slope length of the road in front of the current position of the vehicle 100.

The auxiliary braking driver 218 generates auxiliary braking force of the vehicle 100 in response to an auxiliary braking on/off signal generated from the SCC controller 210. An example of the auxiliary braking of the vehicle 100 according to an embodiment of the disclosure may include exhaust braking. Exhaust braking is a type of engine braking and corresponds to a braking device that closes an exhaust line of an engine to achieve deceleration. When the auxiliary braking on signal is generated from the SCC controller 210, the auxiliary braking driver 218 closes an exhaust line valve (not shown) of the vehicle 100 to block the exhaust line. Exhaust gas that is not discharged due to the blockage of the exhaust line is trapped inside the cylinder of the engine and acts as a resistance, generating a reverse torque. In other words, due to the closure of the exhaust line valve, the exhaust stroke is not smoothly performed during the intake, compression, explosion, and exhaust strokes of the engine, so the remaining intake, compression, and explosion strokes are slowed and the engine speed is rapidly reduced, so that the power transmitted to the wheel 152 is reduced, achieving deceleration (braking) of the vehicle 100. When an exhaust braking mode is activated, when a brake pedal manipulation by the driver is performed in practice, or a braking command corresponding to a brake pedal manipulation is generated from the SCC controller 210, exhaust braking additionally operates together with the main braking driver 254 so that the braking performance of the vehicle 100 is further enhanced. The auxiliary braking of the vehicle 100 according to an embodiment of the disclosure is not limited to the exhaust braking and may further include other auxiliary braking of which braking force is on/off controlled. The on/off control of the braking force is a relative concept compared to a gradual control of the braking force.

The EBS controller 250 is provided to perform overall brake control on the vehicle 100. The EBS controller 250 generates a brake control value for each of a plurality of axles (as described with reference to FIG. 1) based on information about the current weight, wheel speed, and the like of the vehicle 100, and transmits the generated brake control values to the SCC controller 210. The SCC controller 210 drives the main braking driver 254 based on the brake control values of each of the plurality of axles provided by the EBS controller 250 so that the wheels 152 of each of the plurality of axles are braked.

The main braking driver 254 controls braking of the wheels 152 of each of the plurality of axles. When the driver manipulates (applies) the brake pedal of the vehicle 100, the brake oil hydraulic pressure is transmitted to the caliper, and the transferred hydraulic pressure causes the caliper to press the brake pad against the brake disc (or drum), thereby generating a braking force. The rotating brake disc (or drum) comes into frictional contact with the surface of the brake pad, and the frictional force causes the vehicle 100 to decelerate. In some types of vehicles, pneumatic pressure may be used instead of hydraulic pressure, or hydraulic pressure and pneumatic pressure may be used together. However, in a smart cruise control mode, the braking of each of the plurality of wheels 152 and the amount of braking are determined in response to the brake control values provided from the EBS controller 250 rather than based on the manipulation of the brake pedal by the driver.

FIG. 3 is a diagram illustrating characteristics of cyclic brake control of a vehicle according to an embodiment of the disclosure.

In FIG. 3, the top graph 310 is a diagram illustrating braking force characteristics of a cyclic brake control according to an embodiment of the disclosure. In the top graph 310 of FIG. 3, the curve of the related art has a braking force fixed at 20. In the case of the related art, continuous braking is performed to maintain a constant speed when descending a slope in a smart cruise control mode. In this case, when the weight of the loaded cargo is very great or the length of the slope is very long, heat generated in the brake system may be significant. On the other hand, curves indicated by the wheel #1 and the wheel #2 in the top graph 310 of FIG. 3 represent curves of cyclic brake control according to an embodiment of the disclosure. It can be seen from the top graph 310 of FIG. 3 that the wheel #1 and the wheel #2 alternately generate braking forces. In other words, in the cyclic brake control according to the disclosure, wheels of two or more different axles of the vehicle 100 are alternately braked. Due to the cyclic brake control, the wheel #2, which does not generate a braking force, may be cooled while the wheel #1 is generating a braking force, and, conversely, the wheel #1, which does not generate a braking force, may be cooled while the wheel #2 is generating a braking force.

The bottom graph 350 of FIG. 3 is a diagram illustrating heat generation characteristics of the cyclic brake control according to an embodiment of the disclosure. The heat generation characteristics of the bottom graph 350 of FIG. 3 show a cumulative heat generation amount in a slope when it is assumed that the amount of heat generated during the brake control shown in the top graph 310 is proportional to the braking force, and a cooling performance during braking and a cooling performance during non-braking differ about two times from each other. As shown in the bottom graph 350 of FIG. 3, in the related art that continuously performs braking, the cumulative amount of heat is very large. On the other hand, it can be seen that when the wheel #1 and the wheel #2 alternately generate braking forces, the cumulative amount of heat generated by the wheel #1 and the wheel #2 is much smaller than that of the related art.

FIG. 4 is a diagram illustrating an example of cyclic brake control of a vehicle according to an embodiment of the disclosure.

In FIG. 4, a case of a single axle braking is illustrated as one of the embodiments of cyclic brake control. In other words, when there is a concern about excessive heat generation in the brake system as the vehicle 100 descends a slope in a smart cruise control mode, cyclic brake control according to an embodiment of the disclosure may be performed. To this end, as shown in FIG. 4, braking force is generated only from a wheel connected to one axle at a time such that the braking force is sequentially generated starting from the wheel #1 connected to the first axle to the wheel #5 connected to the fifth axle. In FIG. 4, generated braking force applied to only the wheels #1 to #3 are shown (e.g., a first situation 410 in which braking force is only generated for the wheel #1, a second situation 420 in which braking force is only generated for the wheel #2, and a third situation 430 in which braking force is only generated for the wheel #3), but the braking force may be sequentially generated from the wheel #1, then from the wheel #2, then from the wheel #3, then from the wheel #4, then from the wheel #5, then back from the wheel #1, then from the wheel #2, then from the wheel #3 and so on in a cyclical order, such that while a wheel connected to one of the axles is generating a braking force, the other wheels that do not generate braking force may be cooled.

FIG. 5 is a diagram illustrating cyclic brake control of a vehicle according to another embodiment of the disclosure.

In FIG. 5, a case of a double axle braking is illustrated as one of the embodiments of cyclic brake control. In other words, when there is a concern about excessive heat generation in the brake system as the vehicle 100 descends a slope in a smart cruise control mode, cyclic brake control according to an embodiment of the disclosure may be performed. To this end, as shown in FIG. 5, braking force is simultaneously generated from wheels connected to two axels at a time such that braking force is first generated from the wheel #1 connected to the first axle and the wheel #3 connected to the third axle (e.g., situation 510 of FIG. 5), and then braking force is generated from the wheel #2 connected to the second axle and the wheel #4 connected to the fourth axle (e.g., situation 520 of FIG. 5). In the same manner as described above for the examples of FIG. 4, the braking force may be sequentially generated from the wheel #1 and the wheel #3 (e.g., 510 of FIG. 5), then from the wheel #2 and the wheel #4 (e.g., 520 of FIG. 5), then from the wheel #3 and the wheel #5 (e.g., 530 of FIG. 5), then back from the wheel #1 and the wheel #3, then from the wheel #2 and the wheel #4, and so on in a cyclical order, such that while wheels connected to any two of the axles are generating braking force, the other wheels that do not generate braking force may be cooled.

FIG. 6 is a diagram illustrating cyclic brake control of a vehicle according to another embodiment of the disclosure.

In FIG. 6, a case of a triple axle braking is illustrated as one of the embodiments of cyclic brake control. In other words, when there is a concern about excessive heat generation in the brake system as the vehicle 100 descends a slope in a smart cruise control mode, cyclic brake control according to an embodiment of the disclosure may be performed. To this end, as shown in FIG. 6, braking force is simultaneously generated from wheels connected to three axels at a time such that braking force is first generated from the wheel #1 connected to the first axle, the wheel #2 connected to the second axle, and the wheel #3 connected to the third axle (e.g., situation 610 of FIG. 6), and then braking force is generated from the wheel #2 connected to the second axle, the wheel #3 connected to the third axle, and the wheel #4 connected to the fourth axle (e.g., situation 620 of FIG. 6). In the same manner as described above for the examples of FIGS. 4 and 5, the braking force may be sequentially generated from the wheel #1, the wheel #2, and the wheel #3 (e.g., 610 of FIG. 6), then from the wheel #2, the wheel #3, and the wheel #4 (e.g., 620 of FIG. 6), then from the wheel #3, the wheel #4, and the wheel #5 (e.g., 630 of FIG. 6), then back from the wheel #1, the wheel #2, and the wheel #3, then from the wheel #2, the wheel #3, and the wheel #4, and so on in a cyclical order, such that while wheels connected to any three of the axles are generating braking force, the other wheels that do not generate braking force may be cooled.

Figure 7:
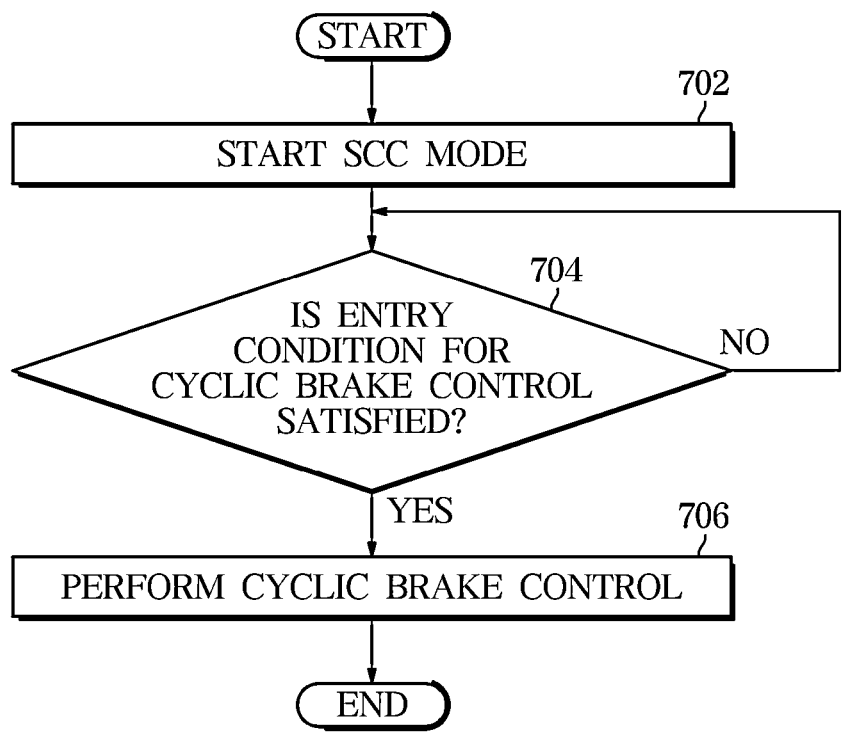
FIG. 7 is a diagram illustrating a method of controlling braking of a vehicle according to an embodiment of the disclosure.

FIG. 7 is a diagram illustrating a method of controlling braking of a vehicle according to an embodiment of the disclosure.

Referring to FIG. 7, when the driver selects a SCC mode, the SCC controller 210 intervenes to control the vehicle 100 (702). While the vehicle 100 is travelling in the SCC mode, the EBS controller 250 identifies whether an entry condition for cyclic brake control is satisfied (704). When the entry condition for the cyclic brake control is satisfied (YES in operation 704), the EBS controller 250 performs the cyclic brake control on the vehicle 100 (706). The cyclic brake control of the vehicle 100 according to embodiments of the disclosure has been described above with reference to FIGS. 2-6.

The entry condition for the cyclic brake control may include the gross vehicle weight of the vehicle, the length of a slope in front of the vehicle, and the average gradient of the slope in front of the vehicle. In other words, by comprehensively considering the gross vehicle weight of the vehicle, the length of the slope, and the average gradient of the slope in front of the vehicle, the combination of conditions in which heat is generated at a certain level or higher may be obtained through an experiment. The experiment result may be applied to each type of vehicle such that the vehicle is controlled to enter the cyclic brake control when the length and the average gradient of a slope in front of a vehicle in an actual driving of the vehicle satisfies a preset travelling condition in which a heat generation is expected to occur at a certain level or higher, so that the heat generation in the braking may be reduced.

A condition for deactivating the cyclic brake control 706 may include a case when a forward collision-avoidance assist function is activated, a case when a SCC mode is deactivated, a case when a brake pedal manipulation occurs by a driver, and the like.

Figure 8:
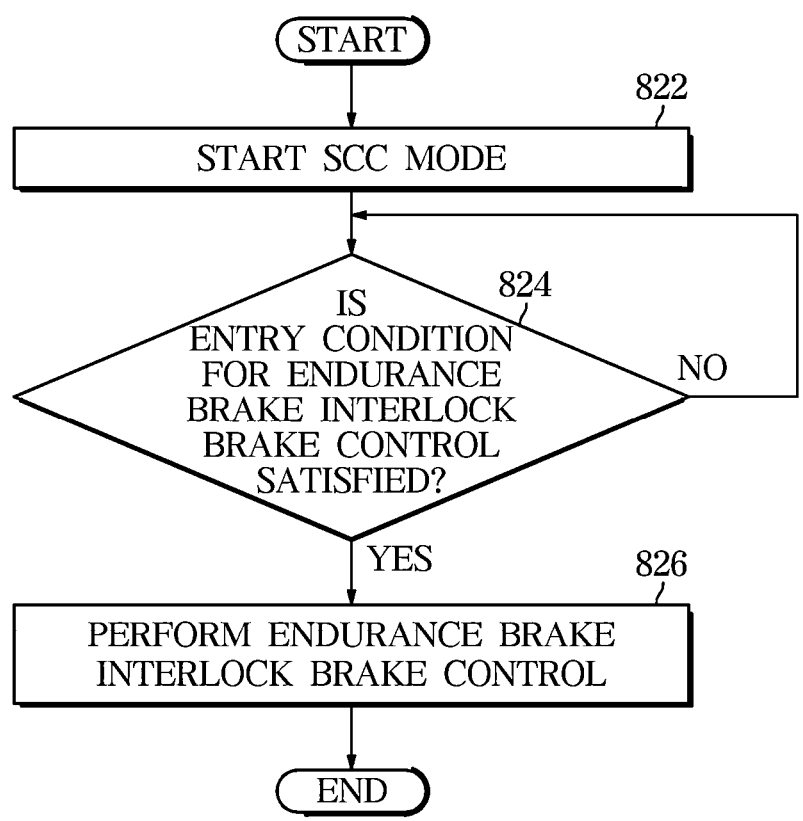
FIG. 8 is a diagram illustrating a method of controlling braking of a vehicle according to another embodiment of the disclosure.

FIG. 8 is a diagram illustrating a method of controlling braking of a vehicle according to an embodiment of the disclosure. In FIG. 8, a method of performing endurance brake interlock brake control on a vehicle is illustrated.

Referring to FIG. 8, when the driver selects a SCC mode, the SCC controller 210 intervenes to control the vehicle 100 (822). While the vehicle 100 is travelling in the SCC mode, the SCC controller 210 identifies whether an entry condition for endurance brake interlock brake control is satisfied (824). The entry condition for endurance brake interlock brake control may include a gross vehicle weight of the vehicle, a length of a slope in front of the vehicle, an average gradient of a slope in front of the vehicle, and a road length that is in proportion to a vehicle speed. When the entry condition for the endurance brake interlock brake control is satisfied (YES in operation 824), the SCC controller 210 performs the endurance brake interlock brake control on the vehicle 100 (826). In the endurance brake interlock brake control, auxiliary braking is first performed through the auxiliary braking driver 218 based on the front slope information of the vehicle 100, and when more braking force is required, additional braking force is generated through the main braking driver 254. In this case, the additional braking force through the main braking driver 254 may be a braking force by a conventional brake control or a braking force by a cyclic brake control.

When the auxiliary braking is exhaust braking, the exhaust braking force may be calculated as follows.

$$\text{Exhaust Braking Force} = C \times g \times \sin D$$

In the above equation, C is a gross vehicle weight (GVW), g is the gravitational acceleration, and D is the gradient (n %) of the road. The gross vehicle weight C is a value calculated by the EBS controller 250. The gradient D (n %) is the minimum gradient at which the speed of the vehicle does not decrease even when the exhaust braking is activated. Since the exhaust braking force is a value already determined according to the specifications of the vehicle 100, the gradient D is a function of the gross vehicle weight C. Therefore, the exhaust braking force may be calculated using the exhaust braking force expressed by the above equation and the gross vehicle weight.

Since a slope length E that may be driven without shifting cycling or without shifting heterogeneity depends on the speed F of the vehicle 100, it may be advantageous to enter an endurance brake interlock brake control when a minimum gradient, rather than an average gradient, during the slope length E, satisfies the minimum gradient D at which deceleration does not occur.

A condition for deactivating the endurance brake interlock brake control 826 may include a case when a forward collision-avoidance assist function is activated, a case when a SCC mode is deactivated, a case when a brake pedal manipulation occurs by a driver, and the like.

Figure 9:
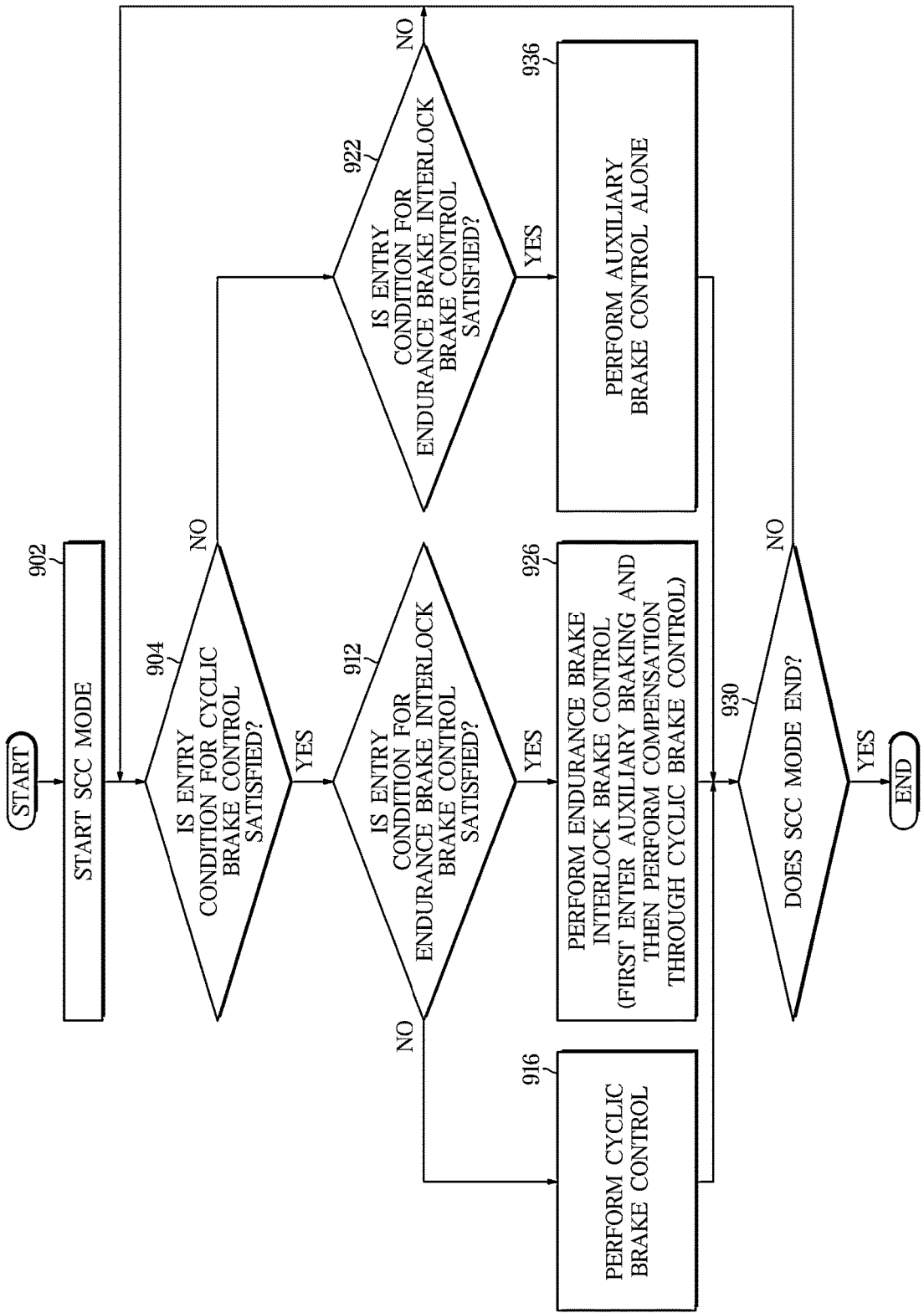
FIG. 9 is a diagram illustrating a method of controlling braking of a vehicle according to another embodiment of the disclosure.

FIG. 9 is a diagram illustrating a method of controlling braking of a vehicle according to another embodiment of the disclosure. In FIG. 9, a vehicle braking method having a combination of cyclic brake control and endurance brake interlock brake control of a vehicle is illustrated. In the brake control method of FIG. 9, only one of the cyclic brake control and the endurance brake interlock brake control may be performed, or both the cyclic brake control and the endurance brake interlock brake control may be performed depending on satisfaction of the entry condition for the cyclic brake control or the entry condition for the endurance brake interlock brake control when the SCC mode is activated.

Referring to FIG. 9, when the driver selects a SCC mode, the SCC controller 210 intervenes to control the vehicle 100 in the SCC mode (902). While the vehicle 100 is travelling in the SCC mode, the EBS controller 250 identifies whether the entry condition for the cyclic brake control is satisfied (904), and the SCC controller 210 identifies whether the entry condition for the endurance brake interlock brake control is satisfied (912 and 922).

When the entry condition for the cyclic brake control is satisfied (YES in operation 904) but the entry condition for the endurance brake interlock brake control is not satisfied (NO in operation 912), the EBS controller 250 performs only the cyclic brake control on the vehicle 100 (916).

When the entry condition for the cyclic brake control is satisfied (YES in operation 904) and the entry condition for the endurance brake interlock brake control is also satisfied (YES in operation 912), the SCC controller 210 first performs braking through auxiliary braking, and then when a braking force greater than that of the auxiliary braking is required, the EBS controller 250 generates an additional braking force through the cyclic brake control to compensate for insufficient braking (926). In this case, the additional braking force generated by the EBS controller 250 may be a braking force by cyclic brake control or a braking force by other conventional main brake control.

When the entry condition for the cyclic brake control is not satisfied (NO in operation 904) and the entry condition for the endurance brake interlock brake control is satisfied (YES in operation 922), the SCC controller 210 performs only the auxiliary brake control on the vehicle 100 (936).

When the entry condition for the cyclic brake control is not satisfied (NO in operation 904) and the entry condition for the endurance brake interlock brake control is not satisfied (NO in operation 922), the EBS controller 250 keeps checking whether the entry condition for the cyclic brake control is satisfied (904).

Such a series of brake control may be continuously repeated while the SCC mode of the vehicle 100 is being activated (930). The conditions for deactivating the brake controls 916, 926, and 936 shown in FIG. 9 include a case when a forward collision-avoidance assist function is activated, a case when the SCC mode is deactivated, a case when a brake pedal manipulation by the driver occurs, and the like.

Figure 10:
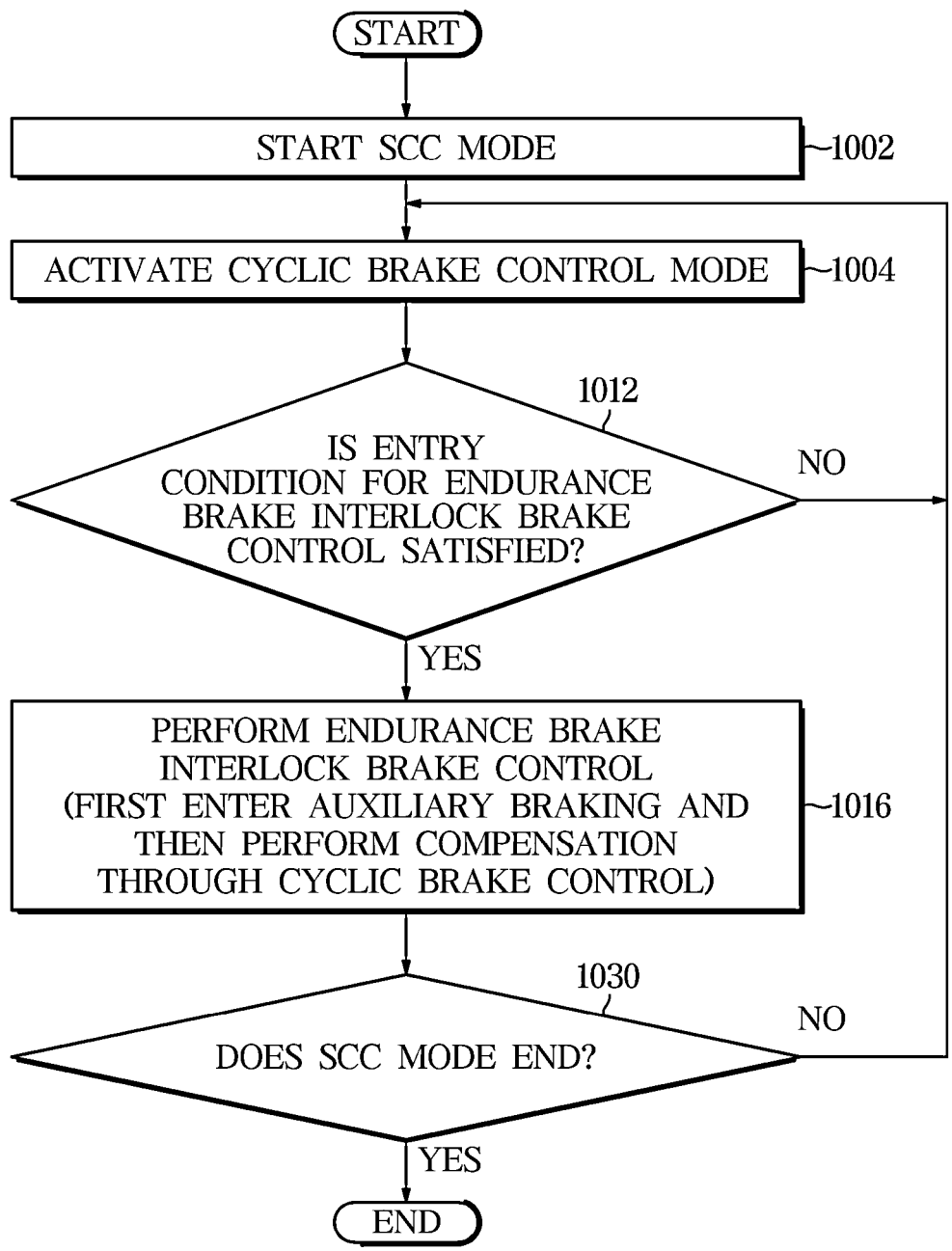
FIG. 10 is a diagram illustrating a method of controlling braking of a vehicle according to another embodiment of the disclosure.

FIG. 10 is a diagram illustrating a method of controlling braking of a vehicle according to another embodiment of the disclosure. In FIG. 10, a vehicle braking method having a combination of cyclic brake control and endurance brake interlock brake control of a vehicle is illustrated. In the brake control method of FIG. 10, the cyclic brake control is basically performed while the SCC mode is activated. When the entry condition for the endurance brake interlock brake control is satisfied, the operation is switched to the endurance brake interlock brake control in which, if needed, the cyclic brake control is additionally performed.

Referring to FIG. 10, when the driver selects a SCC mode, the SCC controller 210 intervenes to control the vehicle 100 in the SCC mode (1002). While the vehicle 100 is travelling in the SCC mode, the EBS controller 250 sets the basic brake control mode of the vehicle 100 to a cyclic brake control mode (1004). When the entry condition for the cyclic brake control is satisfied when the cyclic brake control mode is activated, the EBS controller 250 may perform cyclic brake control on the vehicle 100.

While the vehicle 100 is travelling in the SCC mode in a state in which the cyclic brake control mode is activated, the SCC controller 210 identifies whether the entry condition for the endurance brake interlock brake control is satisfied (1012). When the entry condition for the endurance brake interlock brake control is satisfied (YES in operation 1012), the SCC controller 210 performs the endurance brake interlock brake control on the vehicle 100 (1016). In the endurance brake interlock brake control 1016, the SCC controller 210 first performs auxiliary braking through the auxiliary braking driver 218 based on the front slope information of the vehicle 100, and when a braking force greater than that of the auxiliary brake control is required, the EBS controller 250 generates an additional braking force through the cyclic brake control to compensate for the insufficient braking (1016). In this case, the additional braking force generated by the EBS controller 250 may be a braking force by cyclic brake control or a braking force by other conventional main brake control.

Such a series of brake control may be continuously repeated while SCC mode of the vehicle 100 is being activated (1030). The conditions for deactivating the brake controls 1004 and 1016 shown in FIG. 10 include a case when a forward collision-avoidance assist function is activated, a case when the SCC mode is deactivated, a case when a brake pedal manipulation by the driver occurs, and the like.

As is apparent from the above, the disclosure is implemented to minimize heat generation in a brake system at a time of braking a vehicle and secure an appropriate braking force. In particular, the disclosure is implemented to, when traveling on a long downhill road in a cruise control mode, maintain a constant vehicle speed while reducing heat generated by braking.

The above description of the present disclosure is for illustrative purposes, and a person having ordinary skilled in the art should appreciate that other specific modifications may be easily made without departing from the technical spirit or essential features of the present disclosure. Therefore, the above embodiments should be regarded as illustrative rather than limitative in all aspects. The scope of the disclosure is not to be limited by the detailed description set forth above, but by the accompanying claims of the present disclosure, and it should also be understood that all changes or modifications derived from the definitions and scope of the claims and their equivalents fall within the scope of the present disclosure.

What is claimed is:

1. A method of controlling braking of a vehicle, the method comprising:
   determining whether braking of a vehicle is required; and
   performing cyclic brake control of alternately braking wheels of two or more different axles of the vehicle when the braking of the vehicle is required,
   wherein the cyclic brake control is performed when an inclination condition for a road satisfies a preset condition in a situation in which the braking is required, and
   wherein the preset condition includes a slope length of a road in front of the vehicle.

2. The method of claim 1, wherein
   the preset condition further includes an average gradient of the road in front of the vehicle.

3. The method of claim 1, wherein whether to perform the cyclic brake control is determined further based on a gross vehicle weight of the vehicle in addition to the inclination condition for the road.

4. The method of claim 1, wherein the preset condition further includes a condition that a cumulative heat generation amount of a wheel generating a braking force in the cyclic brake control does not exceed a preset level.

5. A method of controlling braking of a vehicle, the method comprising:
   determining whether braking of a vehicle is required; and
   when the braking of the vehicle is required, first performing auxiliary braking on the vehicle and then selectively performing cyclic brake control, wherein the cyclic brake control includes alternately braking wheels of two or more different axles of the vehicle, wherein the cyclic brake control is performed when an inclination condition for a road satisfies a preset condition in a situation in which the braking is required, and wherein the preset condition includes a slope length of a road in front of the vehicle.

6. The method of claim 5, wherein a preset condition for the auxiliary braking includes a gross vehicle weight, a slope length of a road in front of the vehicle, an average gradient of the road in front of the vehicle, and a road length that is in proportion to a vehicle speed.

7. The method of claim 5, wherein
the preset condition further includes a minimum gradient of the road in front of the vehicle.

8. The method of claim 5, wherein whether to perform the cyclic brake control is determined further based on a gross vehicle weight of the vehicle in addition to the inclination condition for the road.

9. The method of claim 5, wherein the auxiliary braking includes exhaust braking.

10. The method of claim 7, wherein the minimum gradient of the road in front of the vehicle is a gradient at which deceleration of the vehicle by exhaust braking does not occur.

11. The method of claim 7, wherein the slope length is a length at which shift cycling does not occur when the vehicle is driven.

12. A method of controlling braking of a vehicle, the method comprising:
determining whether braking of a vehicle is required; and
depending on whether a preset entry condition is satisfied in a situation in which the braking of the vehicle is required, performing one selected from among:
performing only cyclic brake control of alternately braking wheels of two or more different axles of the vehicle;
performing endurance brake interlock brake control of first performing auxiliary braking on the vehicle and then selectively performing the cyclic brake control; and
performing only auxiliary braking of generating an auxiliary braking force, wherein the cyclic brake control is performed when an inclination condition for a road satisfies a preset condition in a situation in which the braking is required, and wherein the preset condition includes a slope length of a road in front of the vehicle.

13. The method of claim 12, wherein when the preset entry condition for the cyclic brake control is satisfied while a preset entry condition for the endurance brake interlock brake control is not satisfied, the cyclic brake control is performed.

14. The method of claim 12, wherein when the preset entry condition for the cyclic brake control and the preset entry condition for the endurance brake interlock brake control is satisfied, the endurance brake interlock brake control is performed.

15. The method of claim 12, wherein when the preset entry condition for the cyclic brake control is not satisfied while the preset entry condition for the endurance brake interlock brake control is not satisfied, an EBS controller identifies whether the entry condition for the cyclic brake control is satisfied.

16. The method of claim 12, further comprising driving the vehicle in a cruise control mode before the determining of whether the braking is required.

17. A method of controlling braking of a vehicle, the method comprising:
activating a cyclic brake control mode of alternately braking wheels of two or more different axles of a vehicle;
determining whether braking of a vehicle is required when the cyclic brake control mode is activated; and
when a preset entry condition for endurance brake interlock brake control is satisfied in a situation in which the braking of the vehicle is required, performing endurance brake interlock brake control of first performing auxiliary braking and then selectively performing the cyclic brake control,
wherein the cyclic brake control mode is performed when an inclination condition for a road satisfies a preset condition in a situation in which the braking is required, and
wherein the preset condition includes a slope length of a road in front of the vehicle.

18. The method of claim 17, further comprising driving the vehicle in a cruise control mode before the determining of whether the braking is required.

* * * * *